United States Patent [19]

Schneider

[11] Patent Number: 4,805,154
[45] Date of Patent: Feb. 14, 1989

[54] COMBINATION MIXING AND CONVEYING DEVICE FOR HIGHLY VISCOUS FLUIDS

[76] Inventor: Friedhelm Schneider, Zur Platte, D-5226 Reichshof-Hahn, Fed. Rep. of Germany

[21] Appl. No.: 71,990

[22] Filed: Jul. 9, 1987

[30] Foreign Application Priority Data

Jul. 16, 1986 [DE] Fed. Rep. of Germany ....... 3623932

[51] Int. Cl.$^4$ .............................................. B01F 7/18
[52] U.S. Cl. .................................. 366/303; 366/262; 366/307
[58] Field of Search .................. 366/9, 40, 64–66, 366/76, 97, 98, 167, 168, 176, 177, 262, 263, 279, 292, 293, 302–305, 306, 307

[56] References Cited

U.S. PATENT DOCUMENTS

| | | | |
|---|---|---|---|
| 214,729 | 4/1879 | Swihart | 366/303 |
| 3,788,609 | 1/1974 | Toczyski | 366/289 |
| 3,938,783 | 2/1976 | Porter | 366/98 |
| 4,310,124 | 1/1982 | Schwing et al. | 366/307 |
| 4,334,788 | 6/1982 | Miner | 366/303 |

FOREIGN PATENT DOCUMENTS

| | | |
|---|---|---|
| 1150360 | 6/1983 | Fed. Rep. of Germany . |
| 3313710 | 10/1984 | Fed. Rep. of Germany . |
| 1523920 | 3/1968 | France . |

*Primary Examiner*—Timothy F. Simone
*Attorney, Agent, or Firm*—Flynn, Thiel, Boutell & Tanis

[57] ABSTRACT

For mixing and conveying of highly viscous fluids, the invention provides a single-stage or multi-stage axial centrifugal pump to which the components to be mixed are fed through lateral connections (10, 12) in front of the first rotor (FIG. 1). The blades (4, 4') of the or of each rotor (FIG. 2) have at least one hole (5). The lateral connections (10, 12) have at least one mixing nozzle (12) with several holes (13). The pump housing consists of two parts. Fixed guide blades (2, 2') are provided in the lower part (1), out of which the upper part (5) together with rotor shaft (3), its bearings (7, 8) and the rotors can be lifted. A relief and control opening (15) is provided above a gasket (14) which separates the upper part (5) from the inside of the pump.

12 Claims, 2 Drawing Sheets

COMBINATION MIXING AND CONVEYING DEVICE FOR HIGHLY VISCOUS FLUIDS

FIELD OF THE INVENTION

The invention relates to a combination mixing and conveying device for highly viscous fluids.

BACKGROUND OF THE INVENTION

When importance is placed on very homogeneous mixtures of highly viscous fluids of two or more components, whereby at least one of said components is highly viscous, mixing and conveying is usually done in separate devices. A particular disadvantage of the devices is that both devices must be changed over and cleaned, which is time consuming during a change-over from one component to another component, which results in a substantial amount of work during the processing of highly viscous fluids, especially in the plastics industry.

Combination mixing and conveying devices for highly viscous fluids of the above mentioned type are already known. For example German OS No. 33 13 710 describes an agitation device with which both a mixing and also a conveying action can be achieved. The mixing and conveying device consists substantially of a cylindrical housing, on an inner wall of which there are mounted several stationary guide blades, forming guide wheels, and relative to which extends coaxially a rotor shaft with rotors, so that the cylindrical housing with the guide blades forming guide wheels and being stationary on its inner wall forms the stator and the rotor shaft with the rotors arranged thereon forms the rotor. It furthermore has a slide-ring packing which seals off a mixing chamber to the outside and has lateral inlet openings for entry of the fluids to be mixed and an outlet opening for the ready mixture.

It is true that it is possible with this agitation device to substantially increase the mixing and conveying action, in particular for operations in the fiber technology or for example during the manufacture of photo-emulsions. However, the manufacture of the stationary guide blades forming guide wheels in the shape of prongs, complicated in their form, for the stator and also the manufacture of the guide wheels for the rotor, which guide wheels also consist of prongs and are arranged on the rotor shaft, is very complicated and accordingly expensive. Since the agitation device is similar in characteristic to a spiral conveyor, it has, because of the intensive mixing action which is to be achieved, also a structural length which is still too long and is therefore also expensive to manufacture. Also if mixing and conveying takes place in separate agitation devices, a change-over and a time-consuming cleaning of the devices is needed for changing from one component to another component. This results during the processing of highly viscous fluids, particularly in the plastics industry, in a considerable amount of work. An admixing of one or several components during the mixing or conveying is also not possible.

German AS No. 1 150 360 discloses a kneading and fine-grinding machine for pastelike masses, in particular for tough or initially very coarse pastelike masses, like chocolate masses, color bases and other chemical and pharmaceutical products. The kneading and fine-grinding machine has a double-cylinder trough arranged in a lying position and two shafts which are rotatably supported in its cylinder axes, rotate at the same speed and are provided with inclined positioned kneading and fine-grinding members reaching to the inner surfaces of the cylinder. The distance between the shafts is less than the diameter of the circles described by the outer edges of the kneading and fine-grinding members. The kneading and fine-grinding members of the machine are constructed in a conventional manner as circular-sector-shaped, preferably flat vanes which are arranged in rows and are provided with openings. The vanes of the one kneading shaft are thereby positioned oppositely inclined to the ones of the other kneading shaft.

The two shafts are coupled automatically with one another so that they can be driven in the same direction of rotation and at the same speed and that the rows of vanes of the two shafts comb through one another in the center of the trough. Sector angle and the inclined position of the vanes and their reciprocal distance are chosen such that during one rotation of the shafts, the inner surfaces of the cylinder are completely brushed over by the outer edges of the vanes and that only a small clearance distance remains between the side edges of the vanes, which side edges pass one another when the rows of vanes comb through one another.

This kneading and fine-grinding machine can achieve a particularly strong kneading and grinding action, for example for tough or initially very coarse pastelike masses, like chocolate masses, dyes and other chemical and pharmaceutical products. Yet this kneading and fine-grinding machine is not suited as a mixing and conveying device for highly viscous fluids. One or several components of the masses in consideration here also cannot be admixed additionally.

French Patent No. 15 23 920 describes a device for mixing of two fluids or gases for the manufacture of fuels. The components of the fluids r gases are each supplied separately through a pipe and a supply line. The pipe is connected to a housing through a connection and is arranged perpendicularly to the housing and supplies the fluids or gases at a high pressure to the housing. The supply line, which extends coaxially to the housing and is flangedly connected to the housing, supplies the fluids or gases at a low pressure to the housing. After the mixing operation is over, the fluids or gases are discharged through an outlet pipe also connected by a flange to the housing. A feed pipe coaxially arranged in the housing and secured by flanges has several openings in its periphery which are connected with an annular chamber created by the pipe line. An inner central pipe mounted on the pipe line and extending in longitudinal direction of the housing has a row of openings provided on the periphery from which the fluid or the gas, after being supplied through an elbow and finally through a hemispherical wall of the inner pipe, can flow into a passageway. Due to the fact that the individual components of the fluids or gases to be mixed can be supplied under different pressures, the necessary movement of the components for their thorough mixing is produced.

Thus the description of this device clearly shows that it is easily suited for the manufacture of homogeneous mixtures from two fluids or gases, however, that it cannot at all be used for the combined mixing and conveying of highly viscous fluids because of its design. The supply line mounted perpendicularly with respect to the housing also is not a mixing nozzle.

Therefore, the basic purpose of the invention is to provide a combination mixing and conveying device for highly viscous fluids, whereby the mixing and conveying device is constructed as a single or multi-stage axial centrifugal pump, in which the highly viscous fluids to be mixed can be supplied laterally and in which the mixing and conveying members are arranged such that an upper housing part with important parts of the device can be lifted off from a lower housing part, so that a changing from one component to another component is possible without a change-over and expensive cleaning of the device.

The advantages achieved with the invention consist substantially in a change-over of devices and their time-consuming cleaning no longer being needed during a changing from one component to another component of highly viscous fluids to be mixed and conveyed, because the combination mixing and conveying device is constructed as a single or multi-stage axial centrifugal pump in which the mixing and conveying members are arranged such that an upper housing part with important parts of the device, after a releasing of screws, can easily be lifted off from the lower housing part. This substantially simplifies the servicing and cleaning of the mixing and conveying device. The individual components are inventively supplied through a lateral adapter piece prior to their being able to supply the first rotor. The mixing of the respective, partially highly viscous fluids takes place only in the pump itself, whereby a gasket mounted in an annular groove prevents the penetration of fluids into the upper housing part, so that the support of the rotor shaft cannot be damaged. Due to the fact that at least one mixing nozzle is provided in the lateral adapter piece, a second component of a highly viscous fluid can be supplied during the mixing. Several holes in the mixing nozzle assure in an advantageous manner a better pre-distribution of the second component. For a better vorticity of the mixture in the axial centrifugal pump, the rotor blades of the guide wheels in particular are provided in a conventional manner with at least one hole.

BRIEF DESCRIPTION OF THE DRAWINGS

Exemplary embodiments of the invention are illustrated in the drawings and will be described in greater detail hereinbelow.

In the drawings.

DETAILED DESCRIPTION

Figure 1:
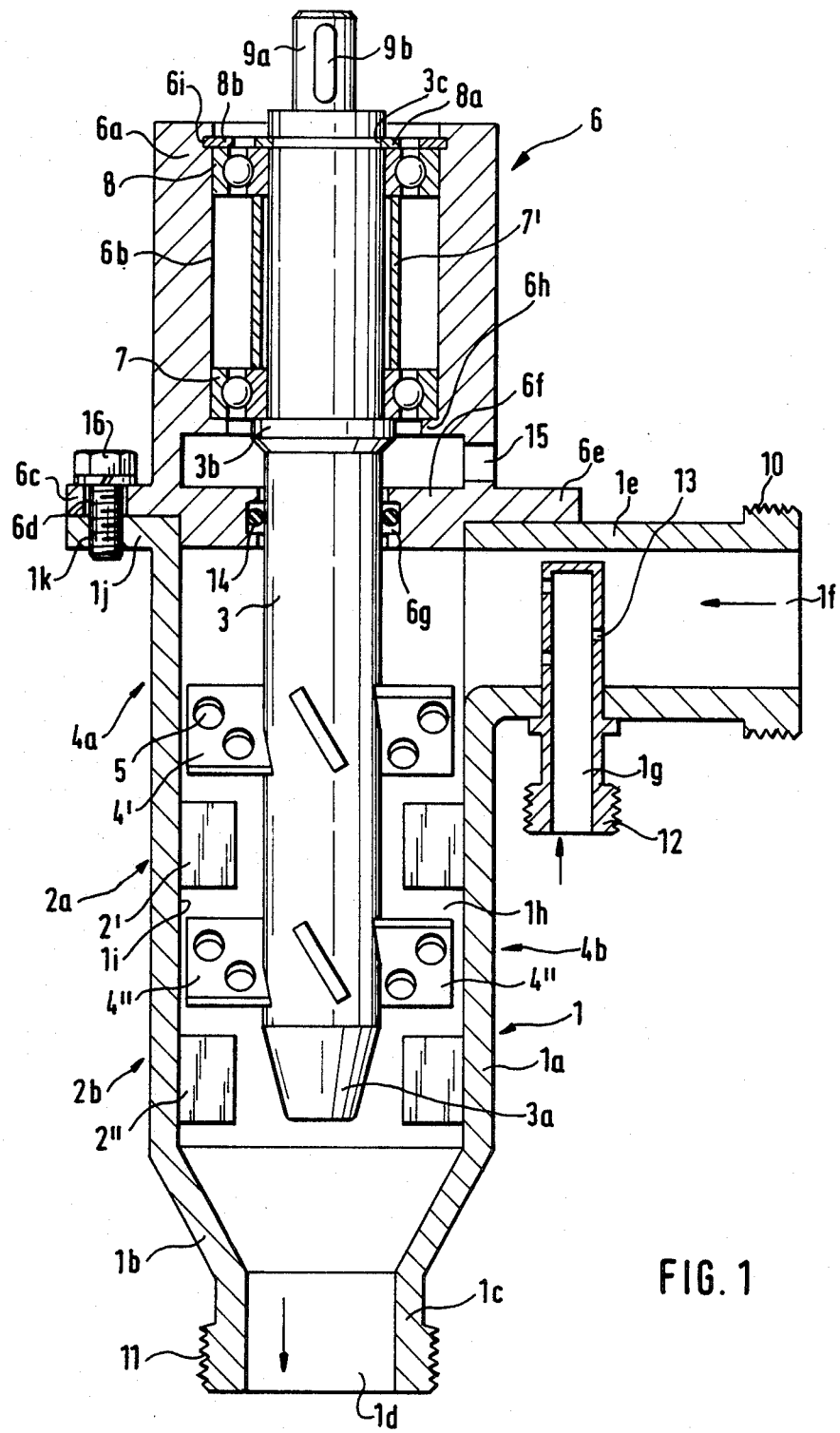
FIG. 1 is a cross-sectional view of the inventive mixing and conveying device.

FIG. 1 illustrates in a cross-sectional view one embodiment of the inventive mixing and conveying device, which is here constructed as a two-stage axial centrifugal pump. In the case of lower demands regarding the quality of the fluids to be mixed, only one stage is sufficient, while in the case of particularly high quality demands, more than two stages must be used. The axial centrifugal pump is housed in a two-part housing consisting of a lower housing part 1 and an upper housing part 6. The lower housing part 1 has first and second guide wheels 2a and 2b on an inner wall 1i of its cylindrical housing section 1a. The guide wheels consist of at least two guide blades 2', 2", which are arranged symmetrically to one another, and are arranged at the same level opposite one another. They can be provided with at least one hole for the purpose of a better vorticity of a highly viscous fluid or mixture. A rotor shaft 3 supported in the upper housing part 6 can be inserted into a mixing chamber 1h of the lower housing part 1. At least two rotor blades 4', 4" are provided on the rotor shaft 3, which rotor blades are inclined to the axis of the rotor and have at least one hole 5 therethrough and each form first and second rotors 4a and 4b.

The lower housing part 1 has a discharge funnel 1b with an outlet connection 1c. The outlet connection 1c has at one end of the lower housing part 1 and outlet opening 1d for the ready mixture and a threaded connection 11 onto which a threaded cap (not illustrated) of a discharge pipe can be screwed. On the right side of the lower housing part 1 at a right angle thereto there is arranged an adapter piece 1e having a threaded connection 10 for receiving a threaded cap of a supply pipe (not illustrated) and an inlet opening 1f for a highly viscous fluid. The adapter piece 1e has a bore 1g at an underside thereof for the insertion of a mixing nozzle 12. The mixing nozzle 12 has several outlet holes 13 in its upper part projecting into the adapter piece 1e. The outlet holes 13 have the purpose of providing a better pre-distribution of the second fluid component of the mixture to be admixed.

A flange 1j having a tapped hole 1k is provided on the left side of the lower housing part 1. A fillister-head screw 16 can be screwed into said tapped hole to screw the upper housing part 6, which will be described below, to the lower housing part 1.

The rotor shaft 3 is supported in ball bearings 7 and 8 in the upper cylindrical housing part 6. The ball bearings 7 and 8 are spaced from one another by a spacer sleeve 7'. The ball bearings 7 are thereby held in position by a section 3b of the rotor shaft 3 and a ring shoulder 6h in the cylindrical housing section 6a of the upper housing part 6. Whereas the ball bearings 8 are held fixedly in position by a retaining ring 8a insertable into an annular groove 3c of the rotor shaft 3 and by a retaining ring 8b insertable into an annular grove 6i of the upper housing section 1a. The rotor shaft 3 has a cone 3a at one end and a raised key 9b on a connecting pin 9a at the other end with which the rotor shaft 3 can be driven by a motor (not illustrated).

The upper housing part 6 has a flange 6c on the left side with a bore 6d therein, so that the fillister-head screw 16 can be inserted into the bore and screwed into the tapped hole 1k of the flange 1j to facilitate the upper housing part 6 being screwed to the lower housing part 1. An annular shoulder 6f on the upper housing section 6a is inserted fittingly into the lower housing part 1 and at the same time a flange 6e on the right side of the upper housing part 6 rests also fittingly on the adapter piece 1e.

The annular shoulder 6f has on a surface facing the rotor shaft an annular groove 6g for a gasket 14. The gasket prevents mixed fluid from the mixing chamber 1h of the axial centrifugal pump to penetrate into the upper housing part 6, where it can possibly damage the bearings for the rotor shaft 3. A pressure-relief and control opening 15 is provided directly above the right flange 6e of the cylindrical housing section 6a.

Figure 2:
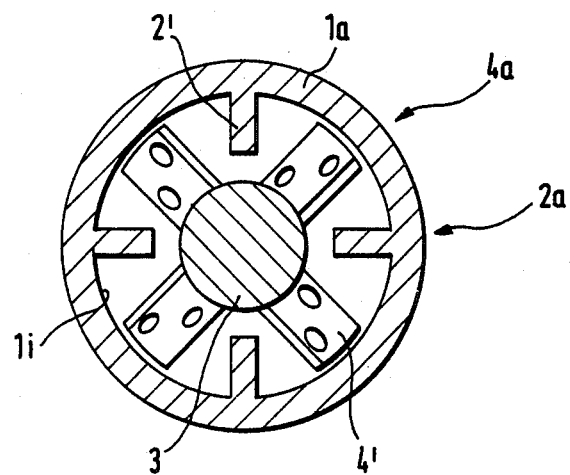
FIG. 2 is a cross-sectional view of the lower housing part of the inventive mixing and conveying device.

FIG. 2 illustrates a cross-sectional view of a lower housing section 1a of the inventive mixing and conveying device. Oppositely positioned guide blades 2' of the first guide wheel 2a are arranged on the inner wall 1i of the housing section 1a. The rotor shaft 3 carries four oppositely positioned, inclined rotor blades 4' each with two holes therein. All of the rotors 4a, 4b provided on the rotor shaft 3 and all of the guide vanes 2a, 2b mounted on the inner wall 1i of the housing section 1a are arranged such that the housing part 6 together with the rotor shaft 3 with its bearings 7, 8 and the guide wheels 4a, 4b, after a releasing of the fillister-head screws not illustrated here, can be lifted out axially, so that a servicing and a cleaning of the mixing and conveying device is much simplified.

It has proven to be particularly advantageous if the mixing nozzle 12 inserted into the adapter piece 1e is rotatable about its axis. This results in a yet more effective mixing.

I claim:

1. In a combination mixing and conveying device for highly viscous fluids comprising a hollow cylindrical housing having an inner wall on which are mounted several stationary guide blades forming guide wheels and coaxially to which extends a rotor shaft having rotor blades thereon, said cylindrical housing with said guide blades forming guide wheels on said inner wall defining a stator and said rotor shaft with said rotor blades thereon defining a rotor; an annular space between said inner surface and an exterior surface of said rotor shaft and defining a mixing chamber; means defining a closure member closing off one end of said cylindrical housing, said closure member having an opening therethrough receiving said rotor shaft; said closure member having a slide-ring packing engaging said exterior surface of said rotor shaft for sealing off said mixing chamber; means defining a lateral inlet opening to said mixing chamber for said fluids to be mixed and means defining an outlet opening from said mixing chamber for a mixed mixture, the improvement comprising wherein said parts, hollow cylindrical housing includes lower and upper housing said mixing chamber being provided in said lower part, said rotor blades on said rotor shaft being oriented in a first set of rotor blades at an upper portion of said mixing chamber and a second set of rotor blades at a lower portion of said mixing chamber, said lateral inlet opening into said upper portion of said lower part above said first set of rotor blades, each blade of said first and second sets of rotor blades having means defining at least one hole therethrough, said guide blades being oriented in a first set of stator blades coaxial with and axially spaced from said first set of rotor blades and in a second set of stator blades coaxial with an axially spaced from said second set of rotor blades, said first and second sets of rotor blades being equidistantly spaced from said first and second set of stator blades.

2. The combination mixing and conveying device according to claim 1, wherein said lateral inlet opening is defined by an adapter piece on said lower housing part and has an inlet opening therethrough and a threaded connection for a pipe on one end, said adapter piece facilitating a supply of a highly viscous, main fluid component, and wherein a discharge funnel means is provided at a lower end of said lower cylindrical housing and has an outlet connection means with an outlet opening and a threaded connection for a discharge pipe to facilitate a removal of said mixed mixture from said mixing chamber.

3. The combination mixing and conveying device according to claim 1, wherein said lateral inlet opening is defined by an adapter piece having at least one bore in a bottom wall thereof, into which bore extends a mixing nozzle having several outlet holes for facilitating the discharge of a second fluid into said inlet opening in said adapter piece.

4. The combination mixing and conveying device according to claim 1, wherein said first and second sets of rotor blades each include plural blades that are equally spaced on said rotor shaft and consist of at least two inclined rotor blades lying symmetrically to one another and are arranged at the same level relative to one another.

5. The combination mixing and conveying device according to claim 1, wherein the first and second set of stator blades each consist of at least two guide blades arranged symmetrically to one another and are arranged at the same level opposite one another.

6. The combination mixing and conveying device according to claim 1, wherein said lower part has a flange thereon with a tapped hole therein, and said upper part has a flange with a bore therein alignable with said tapped hole, so that said lower part can be screwed to said upper part by a threaded fastener means, an annular shoulder on said upper part conforming to the diameter of said inner surface and adapted to be inserted fittingly into said lower part, and a further flange on said upper part supported on said adapter piece.

7. The combination mixing and conveying device according to claim 6, wherein said annular shoulder has an annular gasket receiving groove therein.

8. The combination mixing and conveying device according to claim 6, wherein on said upper part directly above said further flange there is provided a pressure-relief and control opening.

9. The combination mixing and conveying device according to claim 1, wherein said rotor shaft extends into said upper part and is rotatably supported in ball bearings, said ball bearings being spaced form one another by a spacer sleeve and held in position by a section of said rotor shaft, an annular shoulder on said upper part and by a first retaining ring insertable into a first annular groove on said upper part and by a second retaining ring insertable into a second annular groove on said rotor shaft.

10. The combination mixing and conveying device according to claim 1, wherein said rotor shaft has a connecting pin and a raised key thereon.

11. The combination mixing and conveying device according to claim 6, wherein said first and second sets of rotor blades and said first and second sets of stator blades are arranged such that said upper part together with said rotor shaft and its bearings and rotor blades can be lifted out of said lower part after releasing said threaded fastener means.

12. The combination mixing and conveying device according to claim 3, wherein said mixing nozzle is rotatable about its axis.

* * * * *

UNITED STATES PATENT AND TRADEMARK OFFICE
CERTIFICATE OF CORRECTION

PATENT NO. :  4,805,154

DATED : February 14, 1989

INVENTOR(S) : Friedhelm SCHNEIDER

It is certified that error appears in the above-identified patent and that said Letters Patent is hereby corrected as shown below:

Column 5, line 33; delete "parts,".

line 34; after "housing" insert ---parts,---.

Column 6, line 41; change "form" to ---from---.

Signed and Sealed this

Thirty-first Day of October, 1989

Attest:

DONALD J. QUIGG

Attesting Officer     Commissioner of Patents and Trademarks